United States Patent [19]

Yasuda et al.

[11] Patent Number: 5,392,955
[45] Date of Patent: Feb. 28, 1995

[54] BALL FEEDING DEVICE

[75] Inventors: Nobuyuki Yasuda; Masatoshi Yasuda, both of Osaka, Japan

[73] Assignee: Kabushiki Kaisha Yutaka, Osaka, Japan

[21] Appl. No.: 176,261

[22] Filed: Jan. 3, 1994

Related U.S. Application Data

[63] Continuation-in-part of Ser. No. 57,549, May 6, 1993, abandoned.

[30] Foreign Application Priority Data

May 7, 1992 [JP] Japan .................. 4-114747

[51] Int. Cl.⁶ ............................................ G07F 11/02
[52] U.S. Cl. ..................................... 221/203; 221/202; 221/241; 221/258; 221/277; 221/265; 221/312 R
[58] Field of Search ............... 221/200, 202, 203, 209, 221/241, 242, 258, 261, 277, 312 R, 263, 264, 265; 222/239

[56] References Cited

U.S. PATENT DOCUMENTS

| | | | |
|---|---|---|---|
| 1,173,308 | 2/1916 | Rockwell | 221/277 X |
| 2,786,595 | 3/1957 | Nelson | 221/312 R X |
| 4,191,308 | 3/1980 | Allen et al. | 221/202 |
| 4,335,964 | 6/1982 | Drake et al. | 222/239 X |
| 4,962,699 | 10/1990 | Karlsson et al. | 221/200 X |

*Primary Examiner*—Robert P. Olszewski
*Assistant Examiner*—Dean A. Reichard
*Attorney, Agent, or Firm*—Wenderoth, Lind & Ponack

[57] ABSTRACT

A ball feeding device which can feed balls one by one without allowing many impacts on the balls and which can prevent the balls from being magnetized. Balls are accommodated in a housing formed with a conical hole in the bottom thereof. A rotary rod having a conical end is mounted in the housing, the conical end being located near and opposite to the conical hole. Balls are guided one by one into the area between the conical end and the conical hole and discharged one by one through the conical hole. A pair of inclined cylinders are provided under the housing. The balls discharged through the conical hole drop onto the higher end of the gap defined between the cylinders and roll along the gap. The gap expands gradually from the higher end toward the lower end. Thus, the balls drop through the gap into a pan provided under the cylinders while being fed along the gap.

8 Claims, 9 Drawing Sheets

BALL FEEDING DEVICE

This application is a continuation-in-part application of the patent application Ser. No. 08/057,549 filed on May 6, 1993, now abandoned.

BACKGROUND OF THE INVENTION

This invention relates to a ball feeding device for feeding numerous balls, such as balls for ball bearings, pearls or resin balls, one by one to select non-defective balls or to manufacture ball bearings or pearl necklaces.

As is well-known in the art, balls used for ball bearings have to have substantially uniform diameters. Their tolerance is 10 μm, which is very harsh. Thus, after producing numerous balls, it is necessary to select only those balls having diameters within the above tolerance.

FIG. 13 schematically shows the structure of a ball sorter of this type. This device comprises two cylinders 101, 102. A gap is defined therebetween which expands gradually from one end of the cylinders to the other end. Balls 103 are rolled along the gap from its narrow end. Once each ball 103 rolling along the gap reaches a point where the gap diameter is slightly larger than that of the ball, it falls through the gap between the cylinders 101, 102. Thus, one can tell the diameter of each ball by checking the point at which the ball falls. Balls are thus sorted in this manner.

On the other hand, in order to sort balls, numerous balls have to be guided one by one onto the gap between the cylindrical members. A ball feeding device for guiding balls is used in combination with the above ball sorter.

In conventional ball feeding devices of this type, balls are guided one by one by vibrating them. Namely, numerous balls are vibrated microscopically to move them little by little until they are arranged in a line. The aligned balls are then fed one by one.

But this type of conventional ball feeding device has a drawback in that, since many balls are vibrated at a time, they tend to damage, chip or deform each other when they collide with each other. Also, by vibrating the balls, they tend to be magnetized or electrostatically charged, so that they may be chained together. This makes it impossible to feed balls one by one and thus to sort balls accurately.

An object of this invention is therefore to feed numerous balls one by one without allowing many impacts on the balls and without the balls being magnetized and electrostatically charged.

SUMMARY OF THE INVENTION

According to the present invention, there is provided a ball feeding device which comprises a housing having a ball discharging hole in the bottom thereof and a rotary rod having its free end located near the discharging hole in the housing. The housing accommodates a plurality of balls, the balls being guided into the space between the free end of the rotary rod and the discharging hole of the housing so as to be discharged one by one from the hole while the rotary shaft is in rotation.

The rotary rod may be formed with a passage that extends from the inside of the housing to its tip, the housing accommodating a plurality of balls. The balls are guided through the passage in the rotary rod and discharged one by one from the housing while the rotary shaft is in rotation.

The passage formed in the rotary rod may be a hole formed in the rotary rod and having an inlet opening defined in the side wall of the rotary rod an outlet opening defined in the tip of the rotary rod.

Also, the passage formed in the rotary rod may be a groove formed in the side wall of the rotary shaft so as to extend from its mid-point to bottom end.

According to the this invention, by rotating the rotary rod, the balls near the rotary rod are moved so that these balls are gradually guided into the space between the conical end of the rotary rod and the conical hole of the housing and discharged one by one from this hole.

The tip of the rotary rod is not limited to a conical one, but may be truncated conical, fusiform or semi-spherical.

By rotating the rotary rod, the balls are guided through the passage in the rotary rod and discharged one by one from the housing.

In the arrangement where the passage in the rotary rod is a hole formed in the rotary rod, the balls in the housing are moved into the hole through its inlet formed in the side wall of the rotary rod and discharged therefrom through its outlet formed in the bottom of the rotary rod.

In the arrangement where the passage in the rotary rod is a groove formed in the rotary rod, the balls in the housing are fed along the groove to the leading end of the rotary rod.

In the ball feeding device according to this invention, the balls can be fed one by one smoothly without being subjected to much impact. The balls are thus protected against damage, chipping and deformation. Also, since the balls are never magnetized nor statically charged, they can be fed separately from each other without being bound together.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
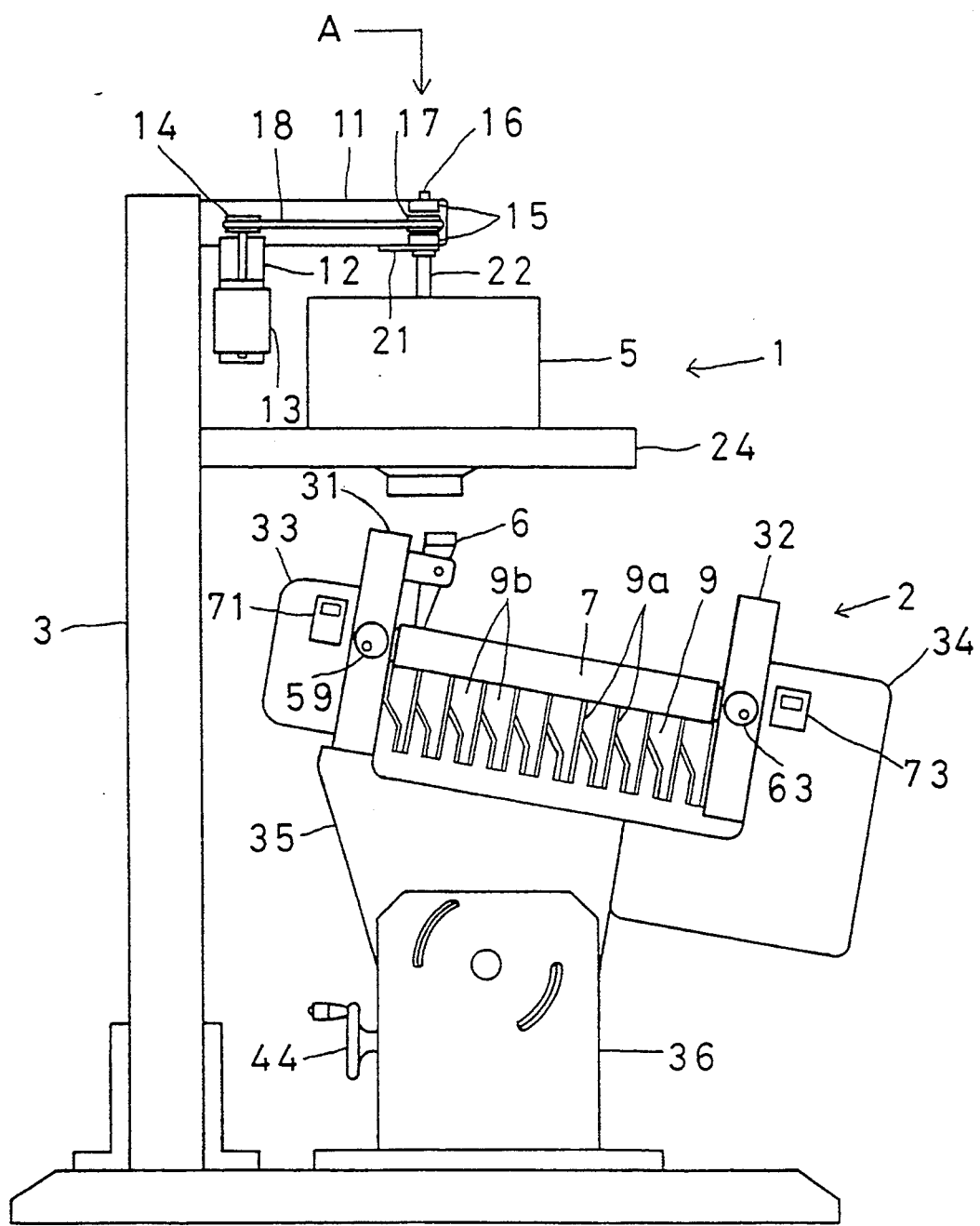
FIG. 1 is a front view of one embodiment according to this invention.

FIG. 1 shows one embodiment according to this invention. This device comprises a ball feeding device 1 and a ball sorter 2. The feeding device 1 is supported by a support post 3 and is disposed over the sorter 2. The feeding device 1 has a housing 5 in which are accommodated numerous balls. A hole is formed in the bottom of the housing 5 through which the balls are discharged one by one.

The discharged balls drop into an inlet 6 of the sorter 2, passes through a guide hole extending through the inlet 6 and are guided into a gap between a cylinder 7 and another cylinder 8 (not shown in FIG. 1). The cylinders 7 and 8 are inclined, so that the balls dropped into the gap roll down to the right along the gap and drop into a pan 9.

The feeding device 1 has an upper beam 11 secured to the top of the support post 3. A motor 13 is mounted on the upper beam 11 by means of a motor fixing member 12. A pulley 14 is secured to the shaft of the motor 13. A pair of bearings 15 are mounted on the front end of the upper beam 11. A rotary rod 16 fixed to a pulley 17 is journalled by these bearings 15. A belt 18 is put around the pulley 14 of the motor 13 and the pulley 17 of the rotary rod 16. Thus, by rotating the motor 13, the rotary rod 16 is rotated.

Figure 2:
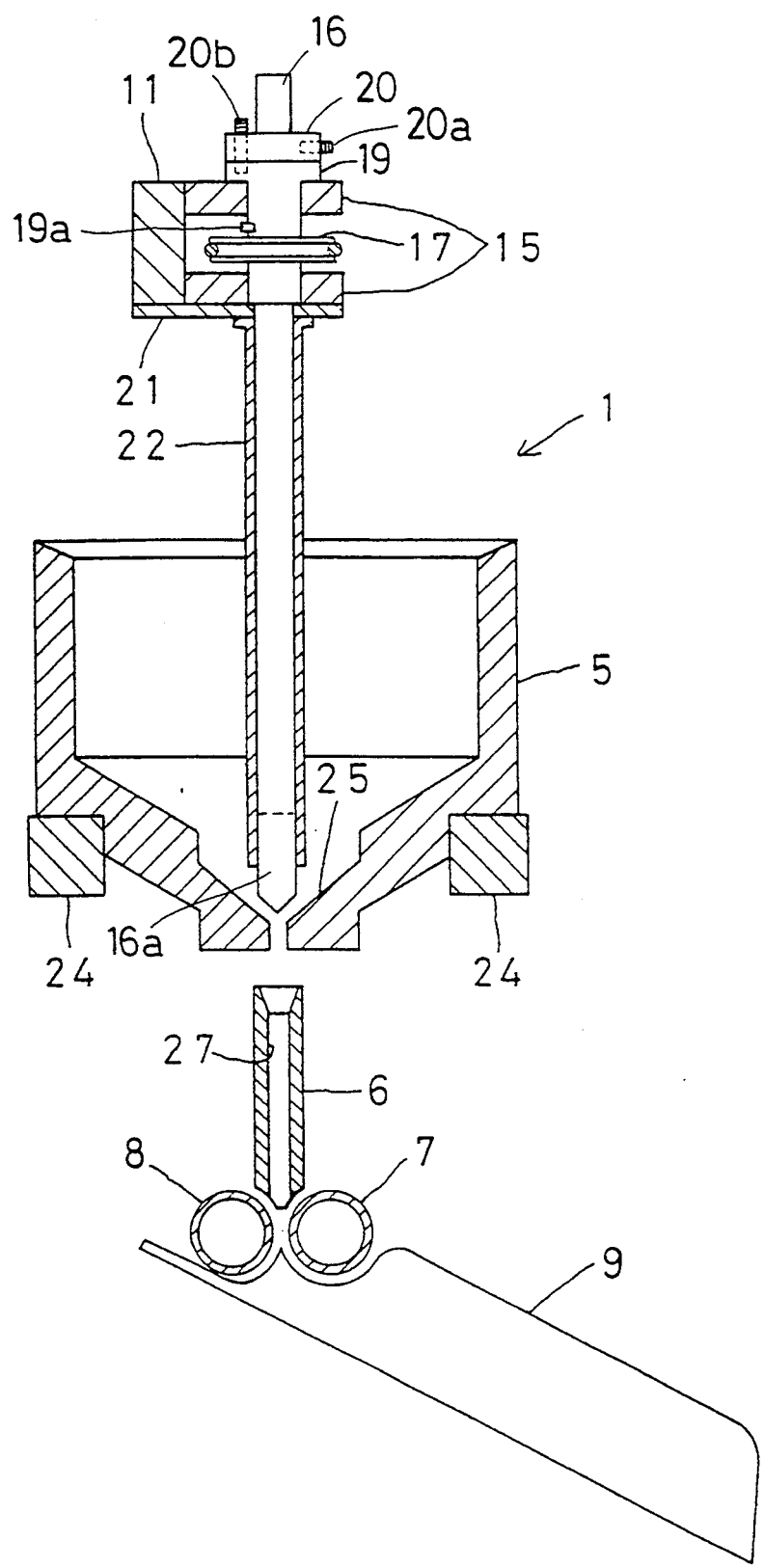
FIG. 2 is a sectional view of a feeding device of this embodiment.
Figure 3:
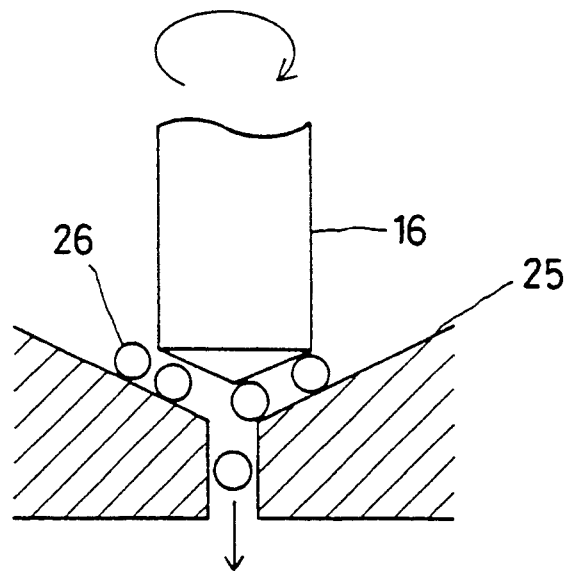
FIG. 3 is a view explaining the operation of the feeding device.

FIG. 2 shows a section of the feeding device 1 taken along arrow A in FIG. 1. In this figure, a sleeve mounting member 21 is fixed to the bottom of the upper beam 11. The member 21 has a sleeve 22 protruding from the bottom thereof. The rotary rod 16 extends through a hole formed in the sleeve mounting member 21 and the sleeve 22, so that its swinging motion is held in check by the sleeve 22. The rotary rod 16 extends near the bottom of the housing 5 and its tip is conically shaped.

The pulley 17 is secured to a lower collar 19 through which the rotary rod 16 extends. The lower collar 19 is journalled by the bearings 15 and is secured to the rotary rod 16 by tightening a screw 19a provided on its peripheral wall. The rotary rod 16 further extends through an upper collar 20 which is secured to the rotary rod 16 by tightening a horizontal screw 20a provided on the collar 20. A vertical screw 20b is also threaded in the upper collar 20. Its bottom end protrudes downwards and is inserted in a hole formed in the end face of the lower collar 19.

The rotary rod 16 can be moved up and down by loosening the screw 19a of the lower collar 19 and the horizontal screw 20a of the upper collar 20. After adjusting the size of the gap between the conical end of the rotary rod 16 and the conical hole 25 of the housing, the screw 19a of the lower collar 19 and the horizontal screw 20a of the upper collar 20 are tightened to fix the vertical position of the rotary rod 16.

In order to finely adjust the gap between the tip of the rotary rod 16 and a hole 25 of the housing 5 in this state, after loosening the screw 19a of the lower collar 19, the vertical screw 20b of the upper collar 20 is turned to adjust the downwardly protruding length of the vertical screw 20b so that the rotary rod 16 is slightly moved up or down. After positioning the rotary rod 16, the screw 19a of the lower collar 19 is tightened to fix the rotary rod 16 in position.

The housing 5 is cylindrical and is fixed in position, sandwiched by a pair of lower beams 24 secured to an intermediate portion of the support post 3. The conical hole 25 is formed in the bottom of the housing 5. The housing 5 and the rotary rod 16 are arranged so that the conical hole 25 and the conical end of the rotary rod 16 face each other.

With numerous balls put in the housing 5, the rotary rod 16 is rotated by the motor 13 at a suitable speed. As the rotary rod 16 rotates, balls 26 in the housing 5 are moved into a space between the conical hole 25 and the conical end of the rotary rod 16. The balls are thus discharged one by one through the hole 25.

The discharged balls pass through a guide hole 27 of an inlet 6 provided in the sorter 2 and drop into the gap between the cylinders 7, 8. The guide hole 27 serves to drop the balls onto the higher end (lefthand side of FIG. 1) of the cylinders 7, 8. This stabilizes the initial rolling motion of the balls in the gap when the cylinders 7, 8 are rotated in the manner as described below. The balls roll down along the gap between the cylinders and drop through the gap into the pan 9.

While feeding the balls in the housing 5 into the gap between the cylinders 7, 8, no violent collision between balls will occur, so that the balls are protected against damage, chipping and deformation. Also, the balls in the housing 5 will never be magnetized or electrostatically charged.

Though not shown, the device may be provided with mechanisms for vertically moving the upper beam 11 and the pair of lower beams 24, respectively. With this arrangement, the gap between the conical end of the rotary rod 16 and the conical hole 25 of the housing 5 can be adjusted properly by moving the rotary rod 16 in the above-described manner and the relative position of the housing 5 to the sorter 2 can be adjusted by moving the lower beams 24.

The rotary rod 16 may have a separable tip portion 16a. For example, such a tip portion 16a may be formed with female threads while the end of the rod may be formed with male threads threadedly engageable with the female threads in the tip portion 16a so that the tip portion is removable from the rod for replacement. With this arrangement, it is possible to select any desired tip portion 16a from among many tip portions of different shapes, such as conical, fusiform or semispherical ones, according to the use.

As shown in FIG. 1, the sorter 2 is provided with a left bearing portion 31 and a right bearing portion 32 to support the pair of cylindrical members 7, 8 so as to be rotatable about their axes and also support the pan 9. It also has a left case 33, a right case 34, a coupling member 35 by means of which the left case 33 and right case 34 are coupled together, and a support member 36 for supporting the coupling member 35.

Figure 4:
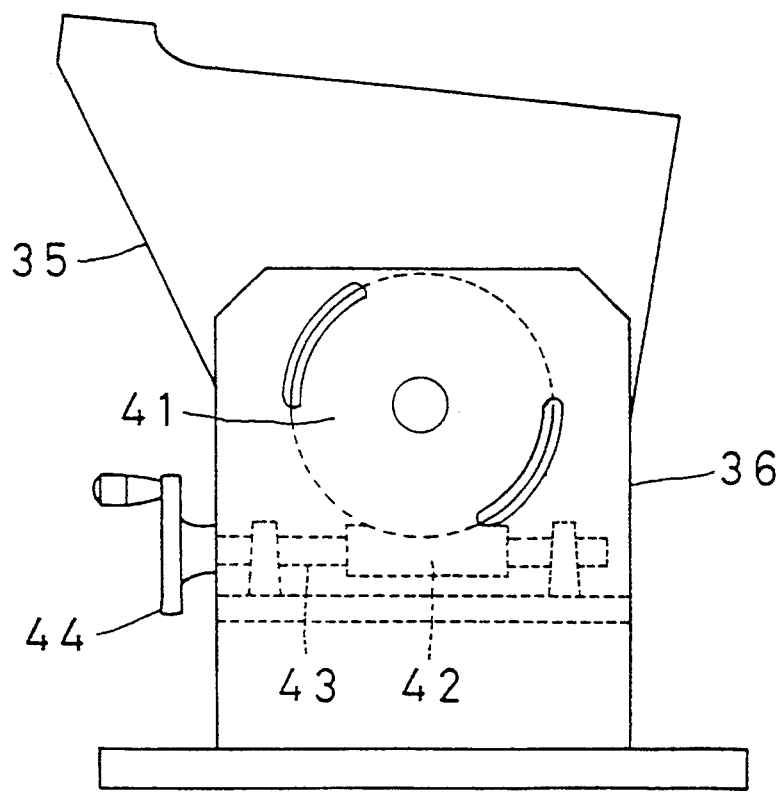
FIG. 4 is a front view of a support member of a sorter of this embodiment.

A worm wheel 41 is journalled to the support member 36 as shown in FIG. 4. The coupling member 35 is fixed to the shaft of the worm wheel 41. Thus, the coupling member 35 turns together with the worm wheel 41. A worm gear 42 is in meshing engagement with the worm wheel 41. A shaft 43 of the worm gear 42 is directly connected to a handle 44. By rotating the handle 44, the worm gear 42 will rotate and thus the worm wheel 41 and the coupling member 35. The pair of cylinders 7, 8 are thus inclined so that their left ends are slightly higher.

Figure 5:
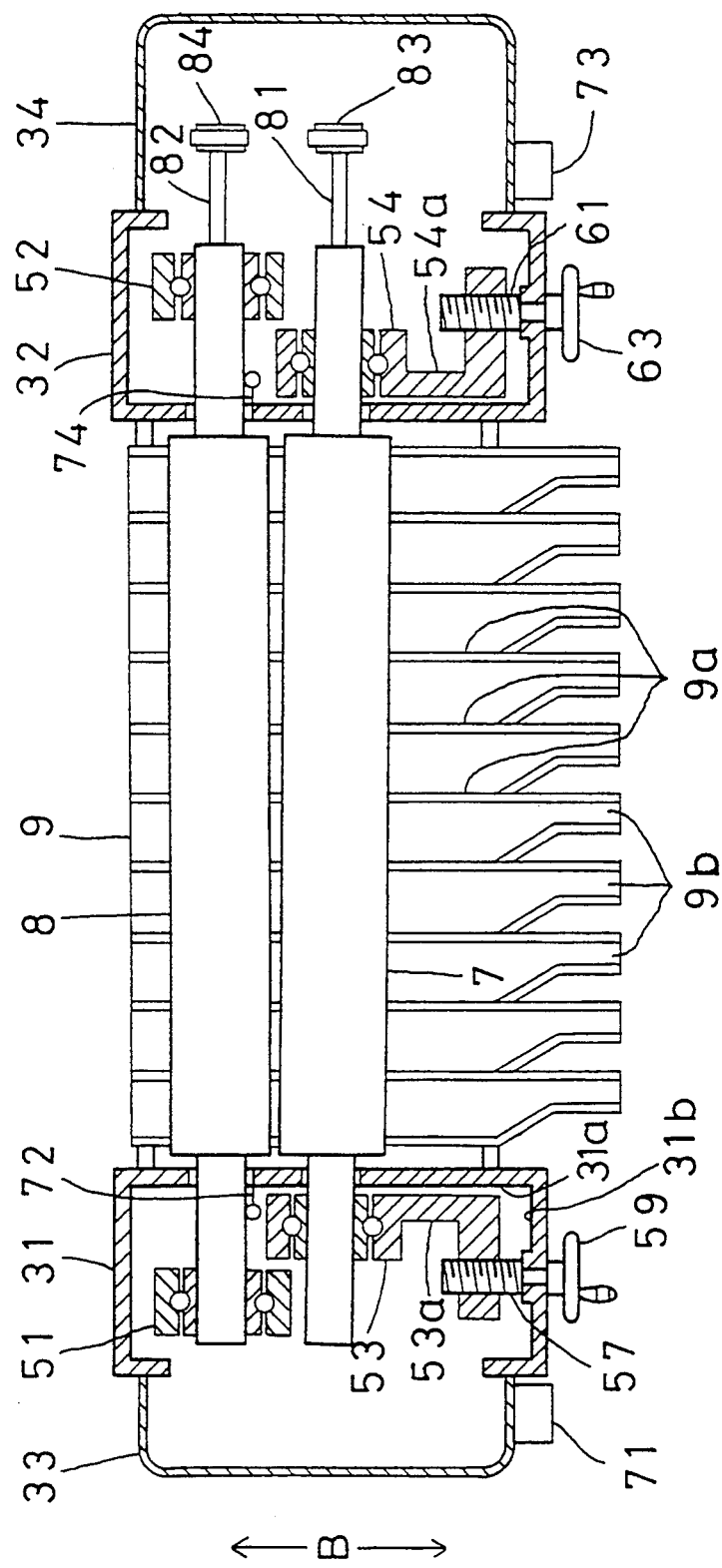
FIG. 5 is a partially sectional view of the sorter.

The pair of cylinders are supported by the left bearing portion 31 and right bearing portion 32 as shown in FIG. 5. Namely, a shaft 8a of the cylinder 8 is supported on fixed bearings 51, 52 fixedly mounted in the left bearing portion 31 and the right bearing portion 32, respectively. A shaft 7a of the cylinder 7 is journalled on movable bearings 53, 54 that are supported in the left bearing portion 31 and the right bearing portion 32, respectively, so as to be movable in the direction of arrow B.

Since the cylinder 8 is supported by the fixed bearings 51, 52 and the cylinder 7 is supported by the movable bearings 53, 54, by moving the movable bearings 53, 54 in the direction of arrow B, the gap between the cylinder 7, 8 can be adjusted so as to be narrow on the left-hand side and wide on the righthand side.

Figure 6:
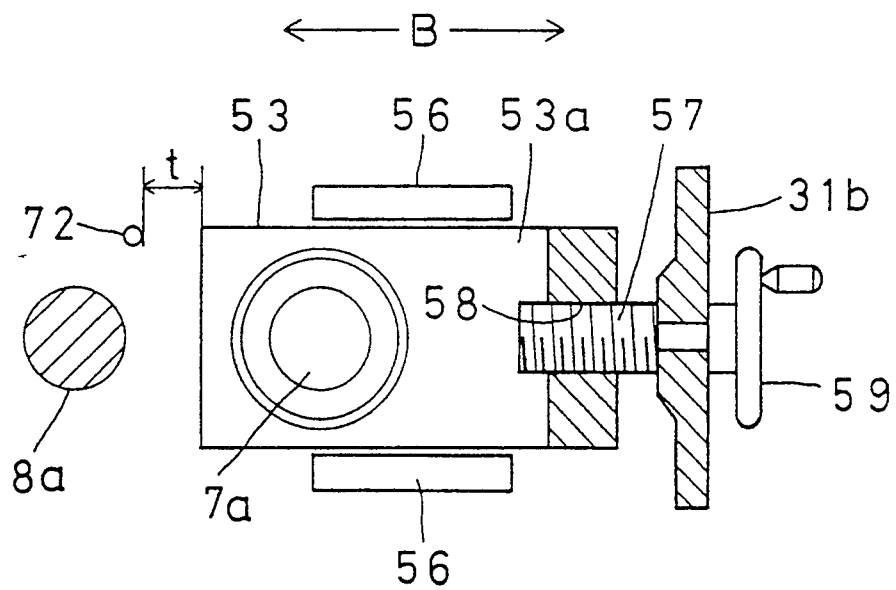
FIG. 6 is a plan view schematically showing a moving mechanism of movable bearings of the sorter.
Figure 7:
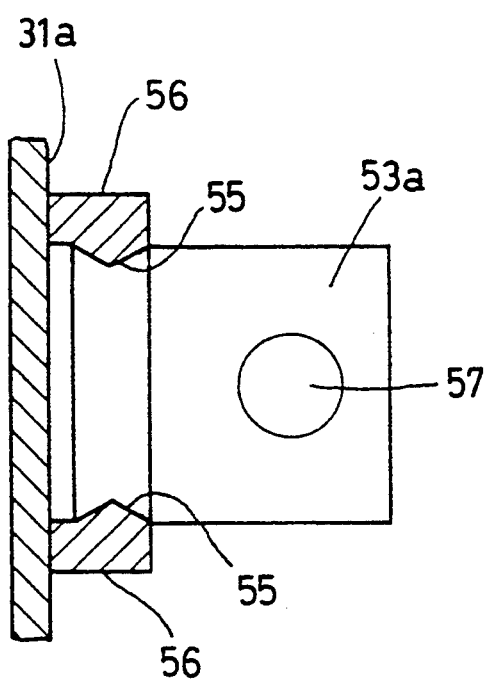
FIG. 7 is a side view schematically showing the moving mechanism of the movable bearings of the sorter.

As shown in FIGS. 6 and 7, the mechanism for movably supporting the movable bearing 53 comprises grooves 55 formed in the top and bottom of a frame 53a of the movable bearing 53, and two rails 56 fixed to a wall 31a of the left bearing portion 31 and fitted in the respective grooves 55.

With this arrangement, the movable bearing 53 can move in the direction of arrow B. A screw 57 is rotatably journalled to a wall 31b of the left bearing portion 31 and is threaded into a threaded hole 58 formed in the frame 53a of the movable bearing 53. By turning a handle 59 coupled to the screw 57, the movable bearing 53 can be moved in the direction of arrow B.

Similarly, the movable bearing 54 is movably supported by sandwiching it with a pair of rails (not shown) fixed to an inner wall surface of the right bearing portion 32. A screw 61 is rotatably journalled to the wall of the right bearing portion 32 and is threaded into a threaded hole formed in a frame 54a of the movable bearing 54. Thus, by turning a handle 63 coupled to a screw 61, the movable bearing 54 can be moved in the direction of arrow B.

A range sensor body 71 is provided on the outer wall surface of the left case 33, while on the inner wall surface of the left bearing portion 31 is provided a range sensor detection unit 72 (FIG. 6) connected to the range sensor body 71 via a line (not shown). The range sensor detecting unit 72 emits a laser beam onto the wall surface of the movable bearing 53 and receives the laser beam reflected by the wall surface.

The range sensor body 71 measures the distance t between the range sensor detecting unit 72 and the wall surface of the movable bearing 53 (shown in FIG. 6), based on the input and output of the range sensor detecting unit 72, and indicates the distance. Since the distance t increases and decreases as the gap between the cylinders 7, 8 increases and decreases at its left end, the gap between the cylinders 7, 8 at its left end can be measured based on the distance t.

Similarly, the right case 34 carries on the outer wall surface a range sensor body 73 while the right bearing portion 32 carries on the inner wall surface a range sensor detecting unit 74. The range sensor body 73 measures the distance between the range sensor detecting unit 74 and the wall surface of the movable bearing 54 based on the input and output of the range sensor detecting unit 74 and indicates the distance. This distance increases and decreases with the gap between the pair of cylinders 7 at its left end. Thus, the gap between the cylinders at its right end can be detected based on this distance.

By turning the handles 59, 63, the pair of cylinders 7, 8 are brought into close contact with each other over the entire length thereof to reduce the gap between the cylinders 7, 8 to zero. In this state, the values indicated on the respective range sensor bodies 71, 73 are set to initial zero's. Namely, in this state, the gap between the cylinders 7, 8 coincides with the values indicated on the respective range sensor bodies 71, 73.

By turning the handles 59, 63 again to increase the gap between the cylinders 7, 8, the distance of the gap between the cylinders at the left end will be displayed on the range sensor body 71 while on the range sensor body 73 will be displayed the distance of the gap between the cylinders at the right end. Thus, by checking the indication on the respective range sensor bodies 71, 73, one can set the gap between the cylindrical members at left and right ends with high accuracy.

Figure 8:
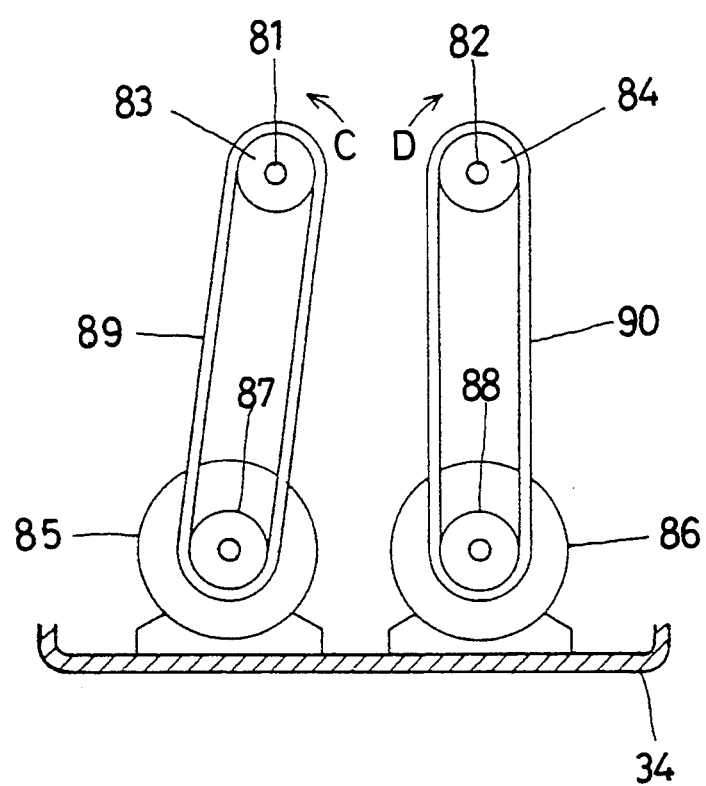
FIG. 8 is a view schematically showing a rotating mechanism of the pair of cylinders of the sorter.

On the other hand, to the righthand sides of the pair of cylinders 7, 8 are coupled rods 81, 82, respectively. The rods 81, 82 carry pulleys 83, 84, respectively. Also, as shown in FIG. 8, two motors 85, 86 are mounted on the bottom of the right case 34. Pulleys 87, 88 are mounted on the shafts of the motors 85, 86, respectively. A belt 89 is put around the pulley 83 on the rod 81 of the cylinder 7 and the pulley 87 on the motor 85. Thus, as the shaft of the motor 85 rotates, the cylinder 7 rotates.

Similarly, a belt 90 is put around the pulley 84 on the rod 82 of the cylinder 8 and the pulley 88 on the motor 6. Thus, as the shaft of the motor 86 rotates, the cylinder 8 rotates. The cylinders 7, 8 rotate in opposite directions to each other. Arrow C indicates the direction of rotation of the cylinder 7. Arrow D indicates the direction in which the cylinder 8 rotates. By rotating the cylinders 7, 8 in opposite directions to each other, balls will never get stuck in the gap between the cylinders 7, 8.

In operation, the handle 59 is turned while checking the indication on the range sensor body 71 to reduce the gap between the cylinders 7, 8 at the left end to be narrower than the permissible minimum diameter of balls, whereas the handle 63 is turned while checking the indication on the range sensor body 73 to increase the gap between the cylinders 7, 8 wider than the permissible maximum diameter of balls.

In this state, the respective cylinders 7, 8 are rotated at suitable speeds while feeding the balls one by one from the feeding device 1 into the gap between the cylinders 7, 8. Any balls having diameters smaller than the permissible minimum diameter will drop through the gap between the cylinders at a portion near the left end into the pan 9. Any balls having diameters between the permissible minimum diameter and the permissible maximum diameter will drop through the gap between the cylinders at substantially the central portion into the pan 9. Any balls having diameters greater than the permissible maximum diameter will drop through the gap between the cylinders at the right end of the cylinders into the pan 9.

The pan 9 has passages 9b partitioned by partitioning walls 9a. Balls having substantially the same diameter drop into each passage 9b. By placing a container under each passage 9b, balls of substantially the same diameter can be collected in each container.

Figure 9:
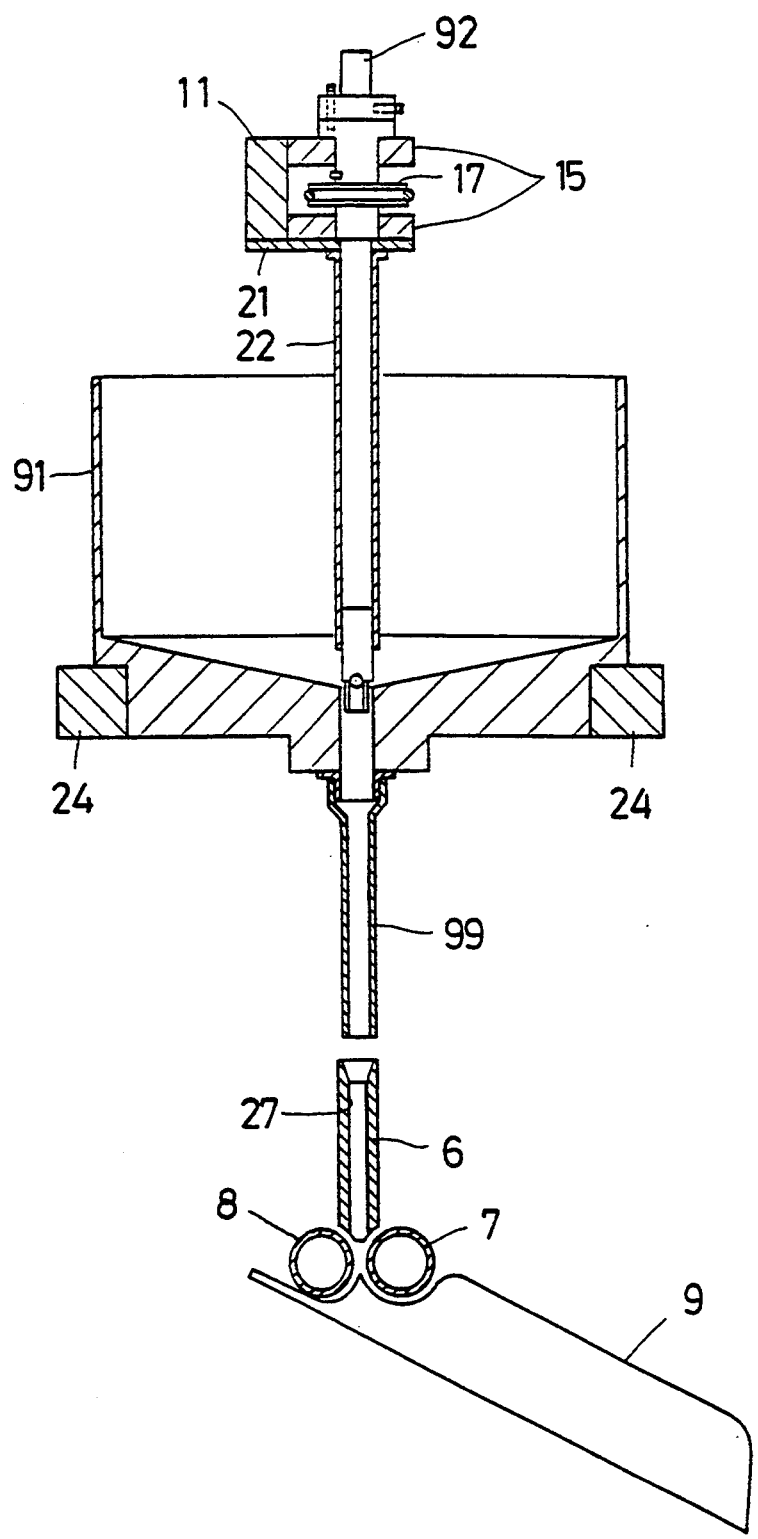
FIG. 9 is a sectional view of another embodiment.

FIG. 9 shows another embodiment of this invention, which has a housing 91 and a rotary rod 92 in place of the housing 5 and the rotary rod 16 shown in FIGS. 1 and 2.

In the bottom center of the housing 91 is formed a hole 93 (FIG. 11) into which the tip of the rotary rod 92 is inserted.

Figure 10:
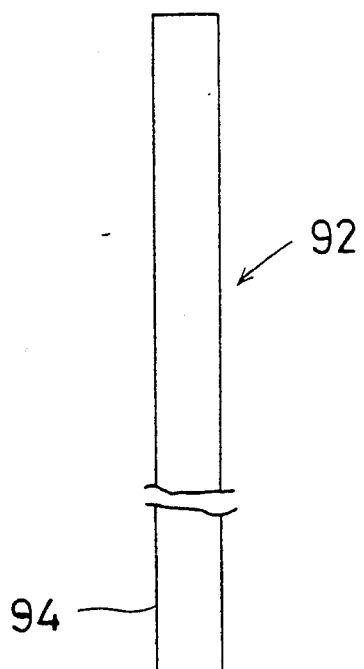
FIG. 10 is a plan view of a rotary rod of a feeding device shown in FIG. 9.

As shown in FIG. 10, the rotary rod 92 comprises a shank 94 and a tip member 95. The shank 94 is formed with male threads 94a on its free end while the tip member 95 has female threads 95a. By screwing the end of the shank 94 into the tip member 95, they are coupled together.

The tip member 95 is formed with an L-shaped hole 96 having a slightly larger inner diameter than the balls and having an inlet opening 96a facing the inside of the housing 91 and an outlet opening 96b in the bottom end face of the tip member.

Figure 11:
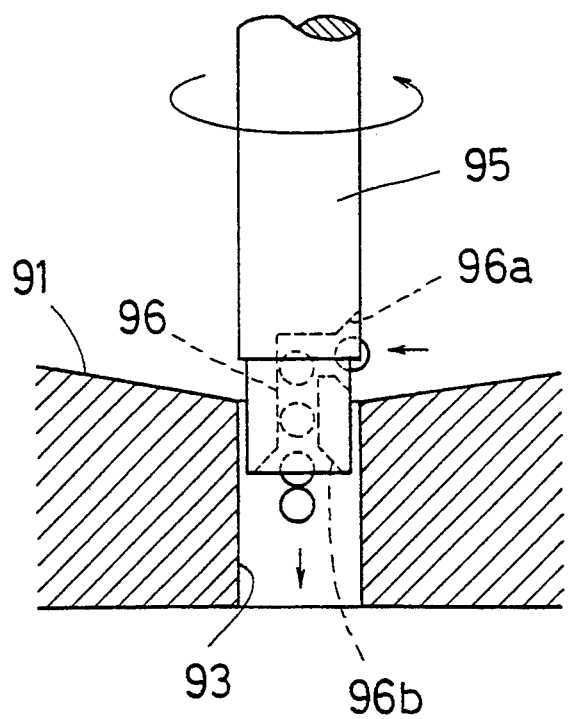
FIG. 11 is a view showing how the rotary rod of the feeding device of FIG. 9 operates.

In operation, by rotating the rotary rod 92, the balls in the housing 91 are moved into the hole 96 in the tip member 95 through its inlet opening 96a and discharged one by one through its outlet opening 96b as shown in FIG. 11. The balls are then guided through a vinyl hose 99 connected to the hole 93 of the housing 91 and through the guide hole 27 formed in the inlet portion 6 of the sorter 2 into the gap between the pair of cylinders 7 and 8 (FIG. 9). The vinyl hose 99 is transparent and is provided so that one can check the balls being fed.

It is preferable to prepare a plurality of kinds of tip members 95 having holes of different diameters so that a proper one can be mounted on the rod 92 according to the diameter of the balls to be fed. The hole formed in the tip member may be helical so that the balls will flow at a controlled speed. Also, the hole may be a branched hole having a plurality of inlet openings which lead to a single outlet opening.

Figure 12:
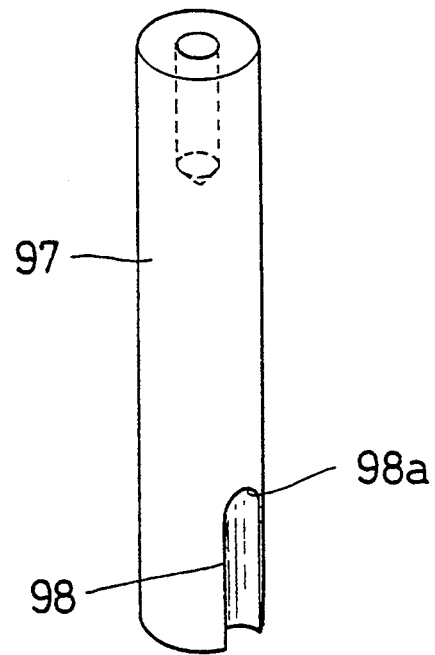
FIG. 12 is a perspective view of a modified example of a tip member of the rotary rod of the feeding device shown in FIG. 9.
Figure 13:
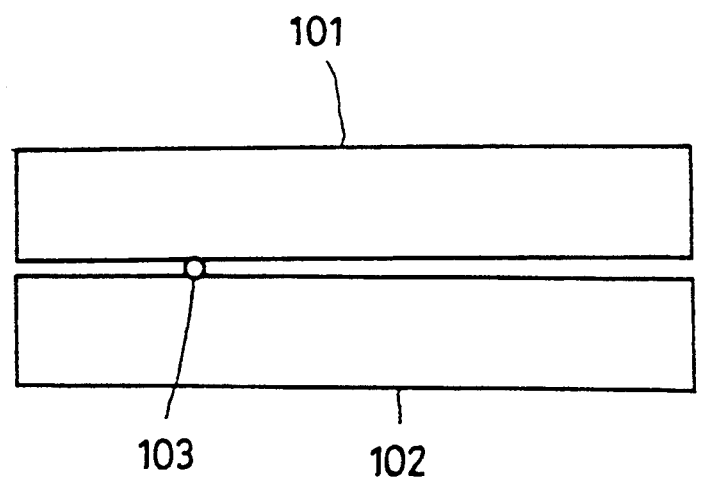
FIG. 13 is a view roughly explaining the structure of a ball sorter.

The tip member may be one generally designated by 97 in FIG. 12. It has a groove 98 formed in its side wall from its mid-point to its bottom end. Coupled to the shank 94, the tip member 97 is inserted in the hole 93 formed in the housing 91. By rotating the rotary shaft 92 in this state, the balls in the housing 91 drop along the groove 98 in the tip member 97 and are discharged one by one from the bottom end of the tip member 97.

In the above embodiment, we show a device for feeding balls for ball bearings. But the present invention is applicable to devices for feeding pearls, resin balls, etc.

What is claimed is:

1. A ball feeding device for feeding a plurality of balls one by one, comprising:

a housing having in the bottom thereof a ball discharging hole, and a rotary rod having a free end located near said discharging hole in said housing, said housing accommodating a plurality of balls, said balls being guided into a space between said free end of said rotary rod and said discharging hole of said housing so as to be discharged one by one from said hole while said rotary shaft is in rotation, wherein said discharging hole in said housing is conically shaped and said free end of said rotary rod has a diameter that is smaller than a midportion of said rotary rod, said discharging hole of said housing and said free end of said rotary rod being located opposite to each other.

2. A ball feeding device for feeding a plurality of balls one by one, comprising:

a housing having in the bottom thereof a ball discharging hole, and a rotary rod having a free end located near said discharging hole in said housing, said housing accommodating a plurality of balls, said balls being guided into a space between said free end of said rotary rod and said discharging hole of said housing so as to be discharged one by one from said hole while said rotary shaft is in rotation, wherein said rotary rod comprises a rotatably supported shank portion and a tip member detachably mounted on a free end of said shank portion.

3. A ball feeding device for feeding a plurality of balls one by one, comprising:

a housing having in the bottom thereof a conical hole, and a rotary rod having a conical end located opposite to the conical hole formed in said housing, said housing accommodating a plurality of balls, said balls being guided into a space between the conical end of said rotary rod and the conical hole of said housing so as to be discharged one by one from said hole while said rotary shaft is in rotation.

4. A ball feeding device as claimed in claim 3, wherein said rotary rod comprises a rotatably supported shank portion and a tip member detachably mounted on a free end of said shank portion.

5. A ball feeding device for feeding a plurality of balls one by one, comprising:

a housing having in the bottom thereof a hole, and a rotary rod having a free end extending through said hole formed in the bottom of said housing, said rotary rod having a passage that extends from the inside of said housing to the free end of said rotary rod, and said housing accommodating a plurality of balls, said balls being guided through said passage in said rotary rod and discharged one by one from said housing while said rotary rod is in rotation.

6. A ball feeding device as claimed in claim 5, wherein said passage in said rotary rod is a hole formed in said rotary rod having an inlet opening defined in the side wall of said rotary rod and an outlet opening defined in the bottom end of said rotary rod.

7. A ball feeding device as claimed in claim 5, wherein said passage in said rotary rod is a groove formed in the side wall of said rotary rod so as to extend from a mid-point of said rotary rod to the free end of said rotary rod.

8. A ball feeding device as claimed in claim 5, wherein said rotary rod comprises a rotatably supported shank portion and a tip member detachably mounted on a free end of said shank portion and formed with said passage.

* * * * *